United States Patent
Ozeki (10) Patent No.: US 11,031,655 B2
(45) Date of Patent: Jun. 8, 2021

(54) NONAQUEOUS ELECTROLYTE SECONDARY BATTERY SEPARATOR AND METHOD OF PRODUCING SAME

(71) Applicant: Sumitomo Chemical Company, Limited, Tokyo (JP)

(72) Inventor: Tomoaki Ozeki, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 119 days.

(21) Appl. No.: 16/428,018

(22) Filed: May 31, 2019

(65) Prior Publication Data

US 2019/0372073 A1    Dec. 5, 2019

(30) Foreign Application Priority Data

Jun. 1, 2018 (JP) .............................. JP2018-106360

(51) Int. Cl.
     *H01M 50/411*    (2021.01)
     *H01M 50/403*    (2021.01)
     *H01M 50/449*    (2021.01)

(52) U.S. Cl.
CPC ....... *H01M 50/411* (2021.01); *H01M 50/403* (2021.01); *H01M 50/449* (2021.01)

(58) Field of Classification Search
CPC .... H01M 10/05; H01M 2/145; H01M 2/1653; H01M 2/1686; H01M 50/411; H01M 50/403; H01M 50/449
See application file for complete search history.

(56) References Cited

U.S. PATENT DOCUMENTS

| | | | |
|---|---|---|---|
| 2009/0226813 A1* | 9/2009 | Takita | H01M 2/1653 |
| | | | 429/247 |
| 2011/0104468 A1 | 5/2011 | Rhee et al. | |
| 2017/0040584 A1* | 2/2017 | Kurakane | H01M 2/1653 |

FOREIGN PATENT DOCUMENTS

| | | | |
|---|---|---|---|
| JP | 2011-524822 A | | 9/2011 |
| JP | 2011216257 A | * | 10/2011 |
| JP | 2016-199734 A | | 12/2016 |
| JP | 2017-002297 A | | 1/2017 |

OTHER PUBLICATIONS

Office Action dated Nov. 6, 2018 in JP Application No. 2018-106360, partial English translation attached.

* cited by examiner

*Primary Examiner* — Carlos Barcena
(74) *Attorney, Agent, or Firm* — Panitch Schwarze Belisario & Nadel LLP (57) ABSTRACT

A nonaqueous electrolyte secondary battery separator is provided in which thickness unevenness caused by wrinkles is reduced. The nonaqueous electrolyte secondary battery separator includes a polyolefin porous film, and when a test piece cut out from the nonaqueous electrolyte secondary battery separator is immersed in propylene carbonate, the test piece exhibits an elongation percentage difference of not more than 0.20%; the elongation percentage difference being a difference between (i) an elongation percentage in a longitudinal direction of the test piece as observed after 30 minutes of immersion in propylene carbonate and (ii) an elongation percentage in the longitudinal direction of the test piece as observed after 24 hours of immersion in propylene carbonate.

6 Claims, 1 Drawing Sheet

NONAQUEOUS ELECTROLYTE SECONDARY BATTERY SEPARATOR AND METHOD OF PRODUCING SAME

This Nonprovisional application claims priority under 35 U.S.C. § 119 on Patent Application No. 2018-106360 filed in Japan on Jun. 1, 2018, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator") and a method of producing the nonaqueous electrolyte secondary battery separator.

BACKGROUND ART

Nonaqueous electrolyte secondary batteries, particularly lithium-ion secondary batteries, have a high energy density, and are therefore in wide use as batteries for devices such as personal computers, mobile telephones, and portable information terminals. Such nonaqueous electrolyte secondary batteries have recently been developed as on-vehicle batteries.

Patent Literature 1 discloses a heat-resistant synthetic resin porous film having a dimensional change rate, as observed upon immersion in dimethyl carbonate, of not more than 0.8%

CITATION LIST

Patent Literature

[Patent Literature 1]
Japanese Patent Application Publication, Tokukai, No. 2016-199734

SUMMARY OF INVENTION

Technical Problem

Patent Literature 1 discloses that the dimensional change rate is measured after the porous film has been immersed in dimethyl carbonate for 30 minutes. In Patent Literature 1, controlling this dimensional change rate is intended to prevent the occurrence of wrinkles.

However, in such conventional art, there is room for improvement in terms of preventing thickness unevenness caused by wrinkles in the separator. In other words, even if dimensional change after 30 minutes of immersion is prevented, thickness unevenness can still occur after immersion in an electrolyte for an even longer period.

An object of an aspect of the present invention lies in providing a nonaqueous electrolyte secondary battery separator in which thickness unevenness caused by wrinkles is reduced.

Solution to Problem

A nonaqueous electrolyte secondary battery separator in accordance with Aspect 1 of the present invention is a nonaqueous electrolyte secondary battery separator including: a polyolefin porous film, in which in a case where a test piece cut out from the nonaqueous electrolyte secondary battery separator so as to have a size of 100 mm by 8 mm is immersed in propylene carbonate, the test piece exhibits an elongation percentage difference of not more than 0.20%, the elongation percentage difference being a difference between (i) an elongation percentage in a longitudinal direction of the test piece as observed after 30 minutes of immersion in propylene carbonate and (ii) an elongation percentage in the longitudinal direction of the test piece as observed after 24 hours of immersion in propylene carbonate, the longitudinal direction of the test piece being a direction in which an elongation percentage of the nonaqueous electrolyte secondary battery separator is greatest.

A nonaqueous electrolyte secondary battery laminated separator in accordance with Aspect 2 of the present invention includes: the nonaqueous electrolyte secondary battery separator of Aspect 1; and a porous layer.

In Aspect 3 of the present invention, the nonaqueous electrolyte secondary battery laminated separator of Aspect 2 is configured such that the porous layer contains at least one resin selected from the group consisting of a (meth)acrylate-based resin, a fluorine-containing resin, a polyamide-based resin, a polyimide-based resin, a polyester-based resin, and a water-soluble polymer.

In Aspect 4 of the present invention, the nonaqueous electrolyte secondary battery laminated separator of Aspect 3 is configured such that the polyamide-based resin is an aramid resin.

A nonaqueous electrolyte secondary battery member in accordance with Aspect 5 of the present invention includes: a positive electrode; the nonaqueous electrolyte secondary battery separator of Aspect 1 or the nonaqueous electrolyte secondary battery laminated separator of any one of Aspects 2 to 4; and a negative electrode, the positive electrode, the nonaqueous electrolyte secondary battery separator or the nonaqueous electrolyte secondary battery laminated separator, and the negative electrode being arranged in this order.

A nonaqueous electrolyte secondary battery in accordance with Aspect 6 of the present invention includes: the nonaqueous electrolyte secondary battery separator of Aspect 1 or the nonaqueous electrolyte secondary battery laminated separator of any one of Aspects 2 to 4.

A method in accordance with Aspect 7 of the present invention is a method of producing a nonaqueous electrolyte secondary battery separator including a polyolefin porous film, the method including: a drying step in which a separator original sheet including the polyolefin porous film is dried in at least two stages, each of the at least two stages having a respective temperature which is set such that at least two differing temperatures are utilized in the drying step, the at least two stages of the drying step including a stage in which the separator original sheet is heated at a temperature which is not less than 116° C. and not more than 130° C.

Advantageous Effects of Invention

An aspect of the present invention makes it possible to provide a nonaqueous electrolyte secondary battery separator in which thickness unevenness caused by wrinkles is reduced.

DESCRIPTION OF EMBODIMENTS

Figure 1:
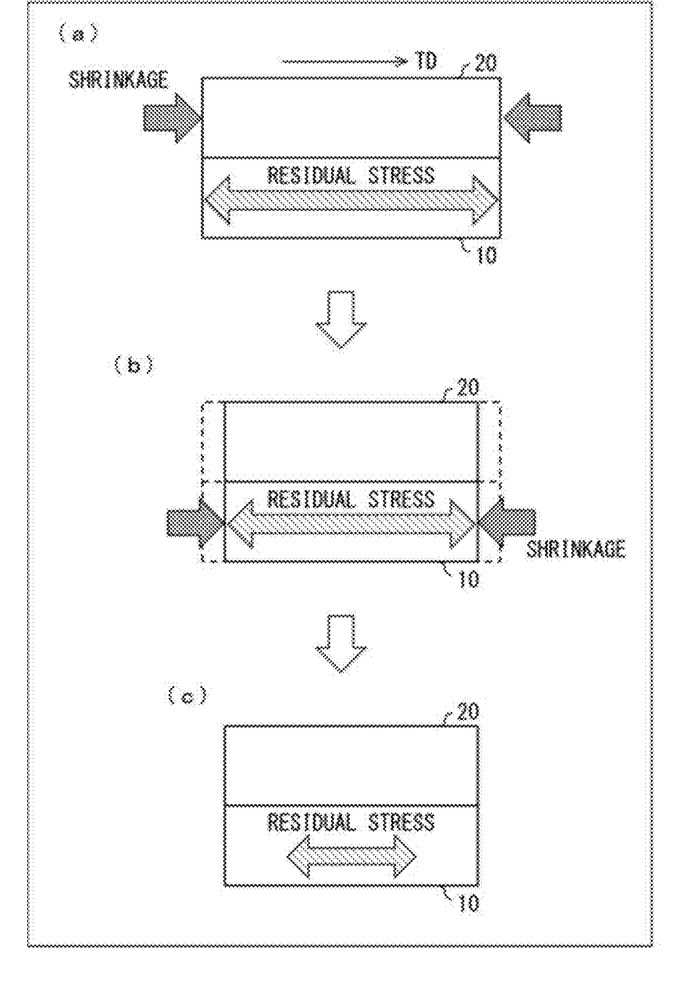
The FIGURE is a diagram schematically illustrating shrinkage of a porous film and a porous layer caused by drying.

The following description will discuss embodiments of the present invention. Note, however, that the present invention is not limited to the embodiment. The present invention is not limited to arrangements described below, but may be altered in various ways by a skilled person within the scope of the claims. The present invention also encompasses, in its technical scope, any embodiment derived by combining technical means disclosed in differing embodiments.

Note that a numerical expression "A to B" herein means "not less than A and not more than B" unless otherwise stated. Furthermore, the term "machine direction" (MD) as used herein refers to a direction in which a separator original sheet is conveyed. The term "transverse direction" (TD) as used herein refers to a direction which is parallel to a surface of the separator original sheet and is perpendicular to the machine direction.

[1. Nonaqueous Electrolyte Secondary Battery Separator]

A nonaqueous electrolyte secondary battery separator in accordance with an embodiment of the present invention is a nonaqueous electrolyte secondary battery separator including: a polyolefin porous film, in which in a case where a test piece cut out from the nonaqueous electrolyte secondary battery separator so as to have a size of 100 mm by 8 mm is immersed in propylene carbonate, the test piece exhibits an elongation percentage difference of not more than 0.20%, the elongation percentage difference being a difference between (i) an elongation percentage in a longitudinal direction of the test piece as observed after 30 minutes of immersion in propylene carbonate and (ii) an elongation percentage in the longitudinal direction of the test piece as observed after 24 hours of immersion in propylene carbonate, the longitudinal direction of the test piece being a direction in which an elongation percentage of the nonaqueous electrolyte secondary battery separator is greatest.

In the present specification, a "nonaqueous electrolyte secondary battery separator" may also be referred to simply as a "separator." Furthermore, the difference between (i) the elongation percentage in the longitudinal direction of the test piece as observed after 30 minutes of immersion in propylene carbonate and (ii) the elongation percentage in the longitudinal direction of the test piece as observed after 24 hours of immersion in propylene carbonate may also be referred to simply as an "elongation percentage difference".

The term "elongation percentage" as used herein refers to a percentage of change between a dimension of the test piece prior to measurement of the elongation percentage and that dimension of the test piece after immersion in propylene carbonate. This change in dimension may also be referred to as an "elongation amount." Measurement of the elongation amount is carried out three times for one sample, and the values of the three measurements are averaged to obtain an average elongation amount. The dimensions of the test piece prior to the above measurement are 100 mm×8 mm. As such, the elongation percentage in the longitudinal direction of the test piece can be calculated from the following formula.

elongation percentage (%) in longitudinal direction of test piece=[(average elongation amount (mm) in longitudinal direction of test piece/100 (mm))]×100

A method of measuring the elongation amount will be described in more detail later in the Examples.

This elongation presumably reflects residual stress generated in a polyolefin porous film in the production process of a separator. In a case where a separator is produced in a manner such that a porous layer is disposed on a polyolefin porous film, the production process involves a drying step to dry the polyolefin porous film and the porous layer, the porous layer having been disposed on the polyolefin porous film via a method such as application of a coating solution.

In the drying step, the polyolefin porous film and the porous layer can each undergo shrinkage that occurs along with volatilization of, for example, a solvent. This shrinkage that occurs along with volatilization of, for example, a solvent tends to occur to a greater degree in the porous layer (obtained by a method such as application of a coating solution) than in the polyolefin porous film. The effects of shrinkage of the porous layer may cause the polyolefin porous film to undergo an even greater degree of shrinkage than if the polyolefin porous film were to be dried alone. In a polyolefin porous film having undergone this greater degree of shrinkage, a force is generated which acts to reverse the extra amount of shrinkage; in other words, residual stress occurs. This causes a difference in the amount of stress acting on the porous layer and the amount of stress acting on the polyolefin porous film. When a nonaqueous electrolyte secondary battery is produced with use of a separator, the separator comes into contact with a nonaqueous electrolyte. Presumably, as the nonaqueous electrolyte permeates into the separator, the difference in the amount of stress is mitigated, and thus elongation of the separator occurs. As a result, thickness unevenness can occur in the separator due to wrinkles. In a case where a battery pack is produced with use of a plurality of cells each having a separator exhibiting a large degree of thickness unevenness due to wrinkles, the thickness of the entire battery pack will be greater than designed. Such a battery pack may not properly fit into a package of standard size.

Even in a case where production of a separator does not involve disposing a porous layer on a polyolefin porous film, elongation can occur in the separator due to a difference in the amount of stress acting on the surface of the polyolefin porous film and the amount of stress acting on the internal portion of the polyolefin porous film. It is therefore presumably possible to reduce thickness unevenness by controlling the elongation percentage difference, not just in a laminated separator having a plurality of layers, but also in a separator consisting of only one layer.

A nonaqueous electrolyte secondary battery separator in accordance with an embodiment of the present invention has an elongation percentage difference of not more than 0.20%, as described above. This means that the elongation percentage difference in the direction in which the elongation percentage is greatest is not more than 0.20%. During conveyance of a separator original sheet, tension is applied in the machine direction, and therefore the separator original sheet is not prone to a difference in the amount of stress in the machine direction. As such, the elongation percentage is typically greatest in the transverse direction of a separator. Measurement of the elongation percentage difference for a long separator or a separator roll utilizes a test piece prepared such that the longitudinal direction of the test piece is the transverse direction. However, in a sheet-type separator, i.e., a separator which has been processed to a predetermined size, it can be difficult to distinguish between the transverse direction and the machine direction. In such a case, if the sheet-type separator is rectangular in shape, then elongation percentage measurements can be performed on (i) a test piece prepared such that the longitudinal direction of the test piece is parallel to a first side of the rectangle and (ii) a test piece prepared such that the longitudinal direction of the test piece is perpendicular to the first side of the rectangle. The test piece found to have a greater elongation percentage can then be used.

In a case where the transverse direction and machine direction of a separator are unknown, test pieces can be prepared with respect to a discretionarily selected plurality of directions, and the test piece found to have the greatest elongation percentage can be used. Note that in the present specification, the "shape" of a separator refers to the shape of a surface of the separator which surface is perpendicular to the thickness direction of the separator.

In an embodiment of the present invention, an elongation percentage difference is measured, via the above-described method, from (i) an elongation percentage of a test piece after the test piece has been immersed in propylene carbonate for 30 minutes and (ii) an elongation percentage of the test piece after the test piece has been immersed in the propylene carbonate for 24 hours. Patent Literature 1 discloses that a dimensional change rate is measured after a test piece has been immersed in dimethyl carbonate for 30 minutes. However, the inventor of the present invention discovered that merely measuring a dimensional change rate after 30 minutes of immersion was insufficient for achieving a nonaqueous electrolyte secondary battery separator having reduced thickness unevenness. When a separator is immersed in an electrolyte, the electrolyte permeates into pores of the separator, and thereafter gradually begins permeating into the resin of the separator. These phenomena can cause elongation of the separator which occurs after approximately 30 minutes of immersion. After this, once the electrolyte permeates even further into the resin of the separator, elongation can occur in internal portions of the resin of the separator. Elongation of internal portions of the resin of the separator is caused primarily by the above-described residual stress in internal portions of the separator. Such elongation continues to progress even after 30 minutes of immersion in an electrolyte, and progression tends to stop after approximately 24 hours of immersion. For this reason, it is necessary to consider the elongation percentage after 24 hours of immersion in electrolyte. Note that, in the descriptions below, the elongation percentage measured after 30 minutes of immersion in propylene carbonate and the elongation percentage measured after 24 hours of immersion in propylene carbonate may simply be referred to as "30-minute elongation percentage" and "24-hour elongation percentage", respectively.

The inventor of the present invention also discovered that in order to achieve a nonaqueous electrolyte secondary battery separator having reduced thickness unevenness, instead of merely controlling an elongation amount or an elongation percentage, it is preferable to control the above-described elongation percentage difference to fall within a specific range. An elongation percentage difference of not more than 0.20% indicates that only a small amount of elongation occurs in the period from (i) the point at which the separator has been immersed for 30 minutes to (ii) the point at which the separator has been immersed for 24 hours. In other words, there is little elongation caused by residual stress within the separator. That is to say, there is little difference in the amount of stress. As such, a separator exhibiting such an elongation percentage difference makes it possible to prevent wrinkles. The elongation percentage difference is more preferably not more than 0.15%. The elongation percentage difference can be controlled by a method of producing a nonaqueous electrolyte secondary battery separator, as described later.

Because it is the elongation percentage difference which is important as described above, the elongation percentage itself is not particularly limited. However, for example, the 30-minute elongation percentage is preferably not more than 0.40%, and more preferably not more than 0.30%. The 24-hour elongation percentage is preferably not more than 0.60%, and more preferably not more than 0.50%.

Note that there is presumably almost no difference between (i) the elongation percentage difference measured in a separator immediately after production, i.e., a separator which has not yet been incorporated into a nonaqueous electrolyte secondary battery, and (ii) the elongation percentage difference measured in a separator which has been removed from a nonaqueous electrolyte secondary battery which has been produced. This is demonstrated in Example 4 (described later). Even in the case of a separator which has been removed from a nonaqueous electrolyte secondary battery, i.e., a separator which has come into contact with an electrolyte, the elongation percentage difference can be measured by carrying out the above-described measurement method after cleaning and then drying the separator.

A nonaqueous electrolyte secondary battery separator in accordance with an embodiment of the present invention is more effective in a pouch-type cell than in a cylindrical cell. Because a cylindrical cell has a separator which is small in size, the effects of wrinkles are also presumably small. A separator of a pouch-type cell, however, is large is size, and the effects of wrinkles are therefore presumably great. In a case where a separator is used in a pouch-type cell and is rectangular, a short side of the separator may be not less than 70 mm, or not less than 100 mm. A long side of such a separator may be not more than 500 mm, or not more than 400 mm. In a case where a separator has a shape which is not rectangular, the smallest dimension of that shape may be in a range similar to that of the short side described above, and the largest dimension may be in a range similar to that of the long side described above.

<Polyolefin Porous Film>

Hereinafter, a polyolefin porous film may be referred to simply as a "porous film". The porous film contains a polyolefin-based resin as a main component and has therein many pores connected to one another, so that a gas and a liquid can pass through the porous film from one surface to the other. The porous film can be used alone as a nonaqueous electrolyte secondary battery separator.

Further, the porous film can be a base material for a laminated separator for a nonaqueous electrolyte secondary battery (hereinafter referred to as "nonaqueous electrolyte secondary battery laminated separator") in which a porous layer (described later) is provided. A laminated body including the porous layer disposed on at least one surface of the polyolefin porous film is herein referred to as "nonaqueous electrolyte secondary battery laminated separator" or "laminated separator." The nonaqueous electrolyte secondary battery laminated separator can also be described as including a nonaqueous electrolyte secondary battery separator and a porous layer. A nonaqueous electrolyte secondary battery separator for an embodiment of the present invention may further include another layer(s) such as an adhesive layer, a heat-resistant layer, a protective layer, and/or the like, in addition to the polyolefin porous film.

The porous film contains polyolefin in a proportion of not less than 50% by volume, preferably not less than 90% by volume, and more preferably not less than 95% by volume, relative to the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a high molecular weight component improves the strength of a resultant nonaqueous electrolyte secondary battery separator.

Examples of the polyolefin which is a thermoplastic resin include homopolymers and copolymers which are each obtained by polymerizing a monomer(s) such as ethylene, propylene, 1-butene, 4-methyl-1-pentene, 1-hexene, and/or the like. Specifically, examples of such homopolymers include polyethylene, polypropylene, and polybutene. Examples of such copolymers include an ethylene-propylene copolymer.

Among the above examples of polyolefin, polyethylene is more preferable because use of polyethylene makes it possible to prevent a flow of an excessively large electric current at a lower temperature. Preventing the flow of an excessively large electric current is also called "shutdown." Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a thickness of preferably 4 μm to 40 μm, more preferably 5 μm to 30 μm, and still more preferably 6 μm to 15 μm.

A weight per unit area of the porous film can be set as appropriate in view of the strength, thickness, weight, and handleability of the porous film. Note, however, that the weight per unit area of the porous film is preferably 4 $g/m^2$ to 20 $g/m^2$, more preferably 4 $g/m^2$ to 12 $g/m^2$, and still more preferably 5 $g/m^2$ to 10 $g/m^2$, so as to allow the nonaqueous electrolyte secondary battery to have a higher weight energy density and a higher volume energy density.

The porous film has an air permeability of preferably 30 sec/100 mL to 500 sec/100 mL, and more preferably 50 sec/100 mL to 300 sec/100 mL, in terms of Gurley values. A porous film having the above air permeability can achieve sufficient ion permeability.

The porous film has a porosity of preferably 20% by volume to 80% by volume, and more preferably 30% by volume to 75% by volume, so as to (i) retain an electrolyte in a larger amount and (ii) obtain a function of reliably preventing a flow of an excessively large electric current at a lower temperature. Further, in order to achieve sufficient ion permeability and prevent particles from entering the positive electrode and/or the negative electrode, the porous film has pores each having a pore size of preferably not more than 0.3 μm, and more preferably not more than 0.14 μm.

<Porous Layer>

In an embodiment of the present invention, the porous layer, as a member included in a nonaqueous electrolyte secondary battery, can be provided between (i) the polyolefin porous film and (ii) at least one of the positive electrode and the negative electrode. The porous layer can be provided on one surface of the polyolefin porous film or on both surfaces of the polyolefin porous film. Alternatively, the porous layer can be provided on an active material layer of at least one of the positive electrode and the negative electrode. Alternatively, the porous layer can be provided between (i) the polyolefin porous film and (ii) at least one of the positive electrode and the negative electrode, in a manner so as to be in contact with the polyolefin porous film and the at least one of the positive electrode and the negative electrode. The number of porous layer(s) provided between (i) the polyolefin porous film and (ii) at least one of the positive electrode and the negative electrode can be one, two, or more. The porous layer is preferably an insulating porous layer containing a resin.

In a case where the porous layer is disposed on one surface of the polyolefin porous film, the porous layer is preferably disposed on a surface of the polyolefin porous film which surface faces the positive electrode. The porous layer is more preferably disposed on a surface which makes contact with the positive electrode.

Examples of the resin constituting the porous layer include polyolefins; (meth)acrylate-based resins; fluorine-containing resins; polyamide-based resins; polyimide-based resins; polyester-based resins; rubbers; resins each having a melting point or a glass transition temperature of not lower than 180° C.; water-soluble polymers; polycarbonate, polyacetal, and polyether ether ketone.

Of the above resins, polyester-based resins, (meth)acrylate-based resins, fluorine-containing resins, polyamide-based resins, polyimide-based resins, and water-soluble polymers are preferable.

The polyolefins are preferably polyethylene, polypropylene, polybutene, an ethylene-propylene copolymer, and the like.

Examples of the fluorine-containing resins encompass polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins encompass fluorine-containing rubber having a glass transition temperature of not higher than 23° C.

As the polyamide-based resins, aramid resins such as aromatic polyamides and wholly aromatic polyamides are preferable.

Examples of the aramid resins include para-aramids and meta-aramids. Among these, para-aramids are more preferable. Examples of the para-aramids encompass para-aramids each having a para-oriented structure or a quasi-para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and a paraphenylene terephthalamide/2,6-dichloroparaphenylene terephthalamide copolymer. Examples of the meta-aramids encompass poly(metaphenylene isophthalamide), poly(metabenzamide), poly(metaphenylene-4,4'-biphenylene dicarboxylic acid amide), poly(metaphenylene-2,6-naphthalene dicarboxylic acid amide), and a metaphenylene terephthalamide/2,6-dichloroparaphenylene terephthalamide copolymer. Among the above examples, poly(paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C.

include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Each of these resins used in the porous layer can be used solely. Alternatively, two or more of these resins contained in the porous layer can be used in combination.

The porous layer may contain a filler. The filler may be an inorganic filler or an organic filler. An inorganic filler made of an inorganic oxide such as silica, calcium oxide, magnesium oxide, titanium oxide, alumina, mica, zeolite, aluminum hydroxide, or boehmite is more preferable. An amount of filler contained in the porous layer may be 10 weight % to 99 weight %, and may be 20 weight % to 75 weight %, with respect to a total amount of the resin and the filler.

In particular, in a case where the resin used for the porous layer is an aramid resin, controlling the amount of filler contained so as to fall in the above-described range of 20 weight % to 75 weight % makes it possible to control an increase in the weight of the separator due to the filler, and also makes it possible to obtain a separator having favorable ion permeability.

In an embodiment of the present invention, the porous layer is preferably provided between the polyolefin porous film and a positive electrode active material layer of the positive electrode. The descriptions below of the physical properties of the porous layer describe at least the physical properties of a porous layer disposed between the polyolefin porous film and the positive electrode active material layer of the positive electrode in a nonaqueous electrolyte secondary battery.

The porous layer has an average thickness of preferably 0.5 µm to 10 µm per layer (per porous layer), and more preferably 1 µm to 5 µm per layer (per porous layer) in order to ensure adhesion of the porous layer to an electrode and a high energy density. The porous layer having a thickness of not less than 0.5 µm per layer makes it possible to sufficiently prevent an internal short circuit caused by, for example, damage to the nonaqueous electrolyte secondary battery, and also to retain a sufficient amount of the electrolyte in the porous layer. In a case where the thickness of the porous layer is greater than 10 µm per layer, resistance to lithium ion permeation increases in the nonaqueous electrolyte secondary battery. This can cause the positive electrode to deteriorate along with repeated cycles. As a result, the nonaqueous electrolyte secondary battery may suffer a deterioration in a rate characteristic and cycle characteristic. Further, such a porous layer increases the distance between the positive electrode and the negative electrode. This can lead to a decreased internal volume efficiency of the nonaqueous electrolyte secondary battery.

A weight per unit area of the porous layer can be set as appropriate in view of the strength, thickness, weight, and handleability of the porous layer. The weight per unit area of the porous layer is preferably 0.5 g/m$^2$ to 20 g/m$^2$ per layer (per porous layer) and more preferably 0.5 g/m$^2$ to 10 g/m$^2$ per layer (per porous layer). A porous layer having a weight per unit area within the above numerical ranges allows a nonaqueous electrolyte secondary battery including the porous layer to have a higher weight energy density and a higher volume energy density. A porous layer whose weight per unit area exceeds the above ranges tends to cause a nonaqueous electrolyte secondary battery to be heavy.

The porous layer has a porosity of preferably 20% by volume to 90% by volume, and more preferably 30% by volume to 80% by volume, in order to achieve sufficient ion permeability. The pores in the porous layer have a diameter of preferably not more than 1.0 µm, and more preferably not more than 0.5 µm. In a case where the pores each have such a diameter, a nonaqueous electrolyte secondary battery that includes the porous layer can achieve sufficient ion permeability.

A nonaqueous electrolyte secondary battery laminated separator including the porous layer disposed on the porous film has an air permeability of preferably 30 sec/100 mL to 1000 sec/100 mL, and more preferably 50 sec/100 mL to 800 sec/100 mL, in terms of Gurley values. The nonaqueous electrolyte secondary battery laminated separator which has an air permeability falling within the above range allows the nonaqueous electrolyte secondary battery to achieve sufficient ion permeability.

[2. Method of Producing Nonaqueous Electrolyte Secondary Battery Separator]

A method in accordance with an embodiment of the present invention is a method of producing a nonaqueous electrolyte secondary battery separator including a polyolefin porous film, the method including: a drying step in which a separator original sheet including the polyolefin porous film is dried in at least two stages, each of the at least two stages having a respective temperature which is set such that at least two differing temperatures are utilized in the drying step, the at least two stages of the drying step including a stage in which the separator original sheet is heated at a temperature which is not less than 116° C. and not more than 130° C. The term "separator original sheet" as used herein refers to a separator which has not yet been cut and which is long and wide. The separator original sheet can include a polyolefin porous film. A porous layer may be disposed on the polyolefin porous film.

<Method of Producing Polyolefin Porous Film>

A method of producing the porous film is not particularly limited. For example, the polyolefin porous film can be produced by a method as follows. First, polyolefin-based resin is kneaded together with a pore forming agent such as an inorganic bulking agent or a plasticizer, and optionally with another agent(s) such as an antioxidant. After kneading, the kneaded substances are extruded so as to produce a polyolefin resin composition in sheet form. The pore forming agent is then removed from the polyolefin resin composition in sheet form with use of a suitable solvent. After the pore forming agent is removed, the polyolefin resin composition is stretched so that a polyolefin porous film is obtained.

The inorganic bulking agent is not particularly limited. Examples of the inorganic bulking agent include inorganic fillers; one specific example is calcium carbonate. Examples of the plasticizer include, but are not particularly limited to, a low molecular weight hydrocarbon such as liquid paraffin.

As a more specific example of a method for producing the porous film, a method including the following steps may be used.

(A) Obtaining a polyolefin resin composition by kneading ultra-high molecular weight polyethylene, low molecular weight polyethylene having a weight-average molecular weight of not more than 10,000, a pore forming agent such as calcium carbonate or a plasticizer, and an antioxidant;

(B) Forming a sheet by (i) rolling the polyolefin resin composition with use of a pair of reduction rollers and (ii) cooling the polyolefin resin composition in stages while tensioning the polyolefin resin composition with use of a take-up roller whose velocity ratio differs from that of the reduction rollers;
(C) Removing the pore forming agent from the sheet with use of a suitable solvent; and
(D) Stretching the sheet, from which the pore forming agent has been removed, with use of a suitable stretch ratio.

<Method of Producing Porous Layer>

The porous layer can be formed with use of a coating solution which is obtained by (i) dissolving or dispersing resin in a solvent and (ii) dispersing a filler in the solvent. The solvent can be described as being a solvent which the resin is dissolved and also a dispersion medium in which the resin or filler is dispersed. Examples of a method for forming the coating solution include a mechanical stirring method, an ultrasonic dispersion method, a high-pressure dispersion method, and a media dispersion method.

The porous layer can be formed by, for example, (i) a method of applying the coating solution directly to a surface of a base material and then removing the solvent, (ii) a method of applying the coating solution to an appropriate support, subsequently removing the solvent so as to form a porous layer, pressure-bonding the porous layer to the base material, and peeling the support off, (iii) a method of applying the coating solution to a surface of an appropriate support, pressure-bonding the base material to that surface, peeling the support off, and then removing the solvent, or (iv) a method of carrying out dip coating by immersing the base material into the coating solution, and then removing the solvent.

The solvent preferably (i) does not have an adverse effect on the base material, (ii) allows the resin to be uniformly and stably dissolved in the solvent, and (iii) allows the filler to be uniformly and stably dispersed in the solvent. Examples of the solvent include N-methyl-2-pyrrolidone, N,N-dimethylacetamide, N,N-dimethylformamide, acetone, and water.

As necessary, the coating solution may contain, as a component(s) other than the resin and the filler, for example, a dispersing agent, a plasticizer, a surfactant, and/or a pH adjusting agent.

Examples of the base material other than the polyolefin porous film include a film other than the polyolefin porous film, a positive electrode, and a negative electrode.

The coating solution can be applied to the base material by a conventionally known method. Specific examples of such a method include a gravure coater method, a dip coater method, a bar coater method, and a die coater method.

In a case where the coating solution includes an aramid resin, the aramid resin can be deposited by applying humidity (i.e., moisture) to the surface on which the coating solution is applied. The porous layer can be formed in this way.

Examples of a method of preparing the aramid resin encompass, but are not particularly limited to, condensation polymerization of para-oriented aromatic diamine and para-oriented aromatic dicarboxylic acid halide. In such a case, the aramid resin obtained is substantially composed of repeating units in which amide bonds occur at para or quasi-para positions of the aromatic ring. "Quasi-para positions" refers to positions at which bonds extend in opposing directions from each other, coaxially or in parallel, as in the case of, for example, 4,4'-biphenylene, 1,5-naphthalene, and 2,6-naphthalene.

A solution of poly(paraphenylene terephthalamide) can be prepared by, for example, a method including the following specific steps (1) through (4).

(1) N-methyl-2-pyrrolidone is introduced into a dried flask. Then, calcium chloride which has been dried at 200° C. for 2 hours is added. Then, the flask is heated to 100° C. to completely dissolve the calcium chloride.
(2) The solution obtained in the step (1) is returned to room temperature, and then paraphenylenediamine is added and completely dissolved.
(3) While a temperature of the solution obtained in the step (2) is maintained at 20±2° C., terephthalic acid dichloride is added, the terephthalic acid dichloride being divided into 10 separate identical portions added at approximately 5-minute intervals.
(4) While a temperature of the solution obtained in the step (3) is maintained at 20±2° C., the solution is matured for 1 hour, and is then stirred under reduced pressure for 30 minutes to eliminate air bubbles, so that the solution of the poly(paraphenylene terephthalamide) is obtained.

<Drying Step>

A method of producing a nonaqueous electrolyte secondary battery separator in accordance with an embodiment of the present invention includes a drying step in which a separator original sheet is dried in at least two stages, each of the at least two stages having a respective temperature which is set such that at least two differing temperatures are utilized in the drying step. In a case where the separator original sheet is a porous film on which a porous layer is disposed, this drying step involving at least two stages makes it possible to dry the porous layer and the porous film in a manner so as to reduce residual stress occurring in the porous film, as described below. Note that, out of the at least two stages of the drying step, a stage which is carried out further upstream in the conveying direction of the separator original sheet is referred to as an "earlier stage", and a stage which is carried out further downstream is referred to as a "later stage".

The FIGURE is a diagram schematically illustrating shrinkage of a porous film 10 and a porous layer 20 caused by drying. As illustrated in (a) of the FIGURE, in the earlier stage of the drying step, the porous layer 20 is prone to shrinkage occurring along with vaporization of a solvent. Residual stress is generated in the porous film 10 due to the effects of the shrinkage of the porous layer 20. Presumably, a large amount of this residual stress is generated primarily in the transverse direction. Next, as illustrated in (b) of the FIGURE, further heating carried out in the later stage of the drying step causes the porous film 10 to shrink. This makes it possible to reduce a difference in the amount of stress acting on the porous layer 20 and the amount of stress acting on the porous film 10. As a result, residual stress is reduced in the porous film 10, as illustrated in (c) of the FIGURE. It is therefore possible to reduce the elongation percentage difference that occurs when the separator comes into contact with an electrolyte. Note that even in the case of a separator original sheet consisting of a single layer of the porous film, the drying step involving at least two stages makes it possible to reduce a difference in the amount of stress acting on the surface of the porous film and the amount of stress acting on the internal portions of the porous film.

In an embodiment of the present invention, the at least two stages of the drying step include a stage in which the separator original sheet is heated at a temperature which is not less than 116° C. and not more than 130° C. Setting the heating temperature to be not less than 116° C. causes the porous film to shrink sufficiently and, as a result, makes it possible to reduce a difference in the amount of stress. Setting the heating temperature to be not more than 130° C. makes it possible to avoid adversely affecting the properties of the separator. In terms of reducing the elongation percentage difference, the heating temperature is more preferably not less than 120° C. and not more than 130° C.

Note that using a higher temperature in the later stage of the drying step than in the earlier stage of the drying step makes it possible to dry the base material even more effectively. In such a case, it is preferable to carry out the later stage of the drying step at a temperature in the above-mentioned ranges. More preferably, a stage of the drying step which utilizes heating at the above temperature range is a stage which is carried out furthest downstream.

For example, the drying step preferably includes (i) a stage in which heating is carried out at a temperature of not less than 100° C. and not more than 115° C., and (ii) a subsequent stage in which heating is carried out at a temperature of not less than 116° C. and not more than 130° C.

The production method preferably includes a drying step involving at least three stages, each of the at least three stages having a respective temperature which is set such that at least three differing temperatures are utilized in the drying step. In such a case, it is preferable that the heating temperature is higher in a stage further downstream as compared to a stage further upstream. Such a configuration makes it possible to dry the porous film after having more sufficiently dried the porous layer. In a case where the production method includes a drying step involving at least three stages, out of the at least three stages, a stage carried out on an upstream side preferably uses a heating temperature of not less than 50° C. and not more than 99° C. A subsequent stage of the drying step preferably uses a heating temperature of not less than 100° C. and not more than 115° C. A more subsequent stage of the drying step preferably uses a heating temperature of not less than 116° C. and not more than 130° C.

The drying may be carried out via, for example, roller heating. Roller heating involves drying a separator original sheet by causing the separator original sheet to contact a heated roller. The roller can be heated by, for example, supplying at heating medium into the roller and circulating the heating medium within the roller. In such a case, the above-described heating temperatures indicate the temperature of the heating medium. It is possible to achieve differing heating temperatures in an earlier stage and a later stage of the drying step by using differing types of heating media at each stage. Possible examples of the heating media include heated water, oil, and steam. For example, heated water may be supplied to a lower-temperature roller, and steam may be supplied to a higher-temperature roller.

[3. Nonaqueous Electrolyte Secondary Battery Member, Nonaqueous Electrolyte Secondary Battery]

A member for a nonaqueous electrolyte secondary battery (hereinafter referred to as a "nonaqueous electrolyte secondary battery member") in accordance with an embodiment of the present invention includes: a positive electrode; the above-described nonaqueous electrolyte secondary battery separator or nonaqueous electrolyte secondary battery laminated separator; and a negative electrode, the positive electrode, the nonaqueous electrolyte secondary battery separator or nonaqueous electrolyte secondary battery laminated separator, and the negative electrode being arranged in this order. A nonaqueous electrolyte secondary battery in accordance with an embodiment of the present invention includes the above-described nonaqueous electrolyte secondary battery separator or nonaqueous electrolyte secondary battery laminated separator.

The nonaqueous electrolyte secondary battery in accordance with an embodiment of the present invention can be produced by a publicly known conventional method. As one example, first, a nonaqueous electrolyte secondary battery member is formed by providing a positive electrode, the polyolefin porous film, and a negative electrode in this order. The porous layer can be provided between the polyolefin porous film and at least one of the positive electrode and the negative electrode. Next, the nonaqueous electrolyte secondary battery member is inserted into a container which serves as a housing for the nonaqueous electrolyte secondary battery. The container is then filled with the above-described nonaqueous electrolyte, and then hermetically sealed while pressure is reduced in the container. In this way, the nonaqueous electrolyte secondary battery in accordance with an embodiment of the present invention can be produced.

<Positive Electrode>

The positive electrode employed in an embodiment of the present invention is not limited to any particular one, provided that the positive electrode is one that is generally used as a positive electrode of a nonaqueous electrolyte secondary battery. Examples of the positive electrode include a positive electrode sheet having a structure in which an active material layer, containing a positive electrode active material and a binding agent, is formed on a positive electrode current collector. The active material layer may further contain an electrically conductive agent.

Examples of the positive electrode active material include materials each capable of being doped with and dedoped of metal ions such as lithium ions or sodium ions. Specific examples of the materials include lithium complex oxides each containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. Each of these electrically conductive agents can be used solely. Alternatively, two or more of these electrically conductive agents can be used in combination.

Examples of the binding agent include: fluorine-based resins such as polyvinylidene fluoride (PVDF); acrylic resin; and styrene butadiene rubber. Note that the binding agent serves also as a thickener.

Examples of the current collector included in the positive electrode (i.e., positive electrode current collector) include electric conductors such as Al, Ni, and stainless steel. Of these electric conductors, Al is more preferable because Al is easily processed into a thin film and is inexpensive.

Examples of a method for producing the positive electrode sheet include: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

<Negative Electrode>

The negative electrode employed in an embodiment of the present invention is not limited to any particular one, provided that the negative electrode is one that is generally used as a negative electrode of a nonaqueous electrolyte secondary battery. Examples of the negative electrode include a negative electrode sheet having a structure in which an active material layer, containing a negative electrode active material and a binding agent, is formed on a negative electrode current collector. The active material layer may further contain an electrically conductive agent.

Examples of the negative electrode active material include materials each capable of being doped with and dedoped of metal ions such as lithium ions or sodium ions. Examples of the materials include carbonaceous materials. Examples of the carbonaceous materials include natural graphite, artificial graphite, cokes, carbon black, and pyrolytic carbons.

Examples of the current collector included in the negative electrode (i.e., negative electrode current collector) include Cu, Ni, and stainless steel. Of these materials, Cu is more preferable because Cu is not easily alloyed with lithium and is easily processed into a thin film.

Examples of a method for producing the negative electrode sheet include: a method in which the negative electrode active material is pressure-molded on the negative electrode current collector; and a method in which (i) the negative electrode active material is formed into a paste with use of an appropriate organic solvent, (ii) the negative electrode current collector is coated with the paste, and (iii) the paste is dried and then pressure is applied so that the paste is firmly fixed to the negative electrode current collector. The paste preferably contains an electrically conductive agent as described above and a binding agent as described above.

<Nonaqueous Electrolyte>

A nonaqueous electrolyte for an embodiment of the present invention is not limited to any particular one, provided that the nonaqueous electrolyte is one that is generally used for a nonaqueous electrolyte secondary battery. The nonaqueous electrolyte can be, for example, a nonaqueous electrolyte containing an organic solvent and a lithium salt dissolved therein. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. Each of these lithium salts can be used solely. Alternatively, two or more of these lithium salts can be used in combination.

Examples of the organic solvent to be contained in the nonaqueous electrolyte include carbonates, ethers, esters, nitriles, amides, carbamates, sulfur-containing compounds, and fluorine-containing organic solvents each obtained by introducing a fluorine group into any of these organic solvents. Each of these organic solvents can be used solely. Alternatively, two or more of these organic solvents can be used in combination.

EXAMPLES

The present invention will be described below in more detail with reference to Examples and Comparative Examples. Note, however, that the present invention is not limited to such Examples.

[Measurement Methods]

The methods used for various measurements in the Examples and Comparative Example are as follows.

<Preparation of Battery; Thickness Unevenness Evaluation>

In each of the Examples and Comparative Examples (described later), a laminated separator roll measuring 275 mm in width was obtained. For each of the Examples and Comparative Examples, the laminated separator roll was dried for 24 hours at a dew point of −40° C. The laminated separator roll was set in a lamination device for batteries. The laminated separator let out from the laminated separator roll was folded back on itself periodically at intervals of 97 mm in the machine direction, in fan-fold-like manner. Tabbed positive electrodes (each measuring 265 mm×90 mm) and tabbed negative electrodes (each measuring 270 mm×95 mm) were disposed on the laminated separator in alternating order, so as to each be sandwiched between two layers of the laminated separator. In other words, a tabbed negative electrode was disposed so as to be sandwiched between the first and second 97 mm sections of the folded laminated separator, a tabbed positive electrode was disposed so as to be sandwiched between the second and third 97 mm sections of the folded laminated separator, another tabbed negative electrode was disposed so as to be sandwiched between the third and forth 97 mm sections of the folded laminated separator, another tabbed positive electrode was disposed so as to be sandwiched between the fourth and fifth 97 mm section of the folded laminated separator, and so forth. For each Example and Comparative Example, a total of 18 tabbed positive electrodes and 19 tabbed negative electrodes were used. After the tabbed positive and negative electrodes were disposed thusly, an end of the laminated separator was fixed with tape. In this way, an electrode laminated body was obtained. The electrode laminated body was inserted into an exterior member made of aluminum. Next, after three sides of the exterior member were subjected to thermocompression bonding, the exterior member was dried in a vacuum at 85° C. for 24 hours. Thereafter, propylene carbonate was introduced into the exterior member. After the propylene carbonate was introduced, the remaining un-bonded side of the exterior member was subjected to thermocompression bonding. In this way, immersion in propylene carbonate was commenced. At points 30 minutes after and 24 hours after commencement of immersion in propylene carbonate, the exterior member was unsealed and the laminated separator was checked for the presence of wrinkles. In cases where the laminated separator was found to have a wrinkle, the thickness of the laminated separator was measured at wrinkled portions and non-wrinkled portions of the laminated separator. Thickness unevenness was evaluated as follows. A laminated separator having no wrinkles was evaluated as "very good" (VG). A laminated separator in which a thickness difference between wrinkled and non-wrinkled portions was less than 1 μm was evaluated as "good" (G). A laminated separator in which a thickness difference between wrinkled and non-wrinkled portions was greater than or equal to 1 μm was evaluated as "poor" (P).

<Elongation Percentage Evaluation>

From each separator obtained in the Examples and Comparative Examples (described later), a test piece (measuring 100 mm in length by 8 mm in width) was cut out. Note that the test piece was cut such that the length of 100 mm extended in the transverse direction, in which the elongation percentage is greatest. The test piece was placed in a 250 mL plastic container having a lid, and then propylene carbonate was introduced into the plastic container. The propylene carbonate was introduced in an amount such that the test piece was completely submerged in liquid. The plastic container was then sealed and left to stand in an environment whose temperature was 23° C. After 30 minutes, the test piece was removed from the plastic container and carefully spread out onto a glass plate (measuring 300 mm in length, 220 mm in width, and 15 mm in thickness) so as not to create wrinkles. Another glass plate of the same size was placed on top of the test piece so as to be fully in contact with the test piece. The elongation amount in the longitudinal direction of the test piece was then measured through the glass plates. A 30 cm stainless steel ruler ("S-30", manufactured by Lion Office Products Corp.) was used to measure the elongation amount. The elongation amount was measured while viewing the marks on the ruler with use of a magnifying glass. Note that the elongation amount measurements were carried out within 3 minutes of removing the test piece from the plastic container. After the measurement, the test piece was placed back into the plastic container, and similar measurements were made again after 24 hours. Note that measurements of the elongation amount were carried out three times for each sample, and the values of the three measurements were averaged to obtain an average elongation amount. The elongation percentage was calculated from the following formula.

(elongation percentage (%))=[(average elongation amount (mm))/100 (mm)]×100

Example 1

<Preparation of Coating Solution>

Poly(paraphenylene terephthalamide) was produced with use of a 3 L separable flask having a stirring blade, a thermometer, a nitrogen inflow tube, and a powder addition port. Hereinafter, poly(paraphenylene terephthalamide) may also be referred to as "PPTA". After the flask was dried sufficiently, 2200 g of N-methyl-2-pyrrolidone (NMP) was introduced into the flask. Thereafter, 151.07 g of calcium chloride powder, which had been dried at 200° C. for 2 hours, was added. The flask was then heated to 100° C. so that the calcium chloride powder was completely dissolved and a solution was obtained. The solution was returned to room temperature, and then 68.23 g of paraphenylenediamine was added and completely dissolved. While a temperature of the solution was maintained at 20±2° C., 124.97 g of terephthalic acid dichloride was added, the terephthalic acid dichloride being divided into 10 separate identical portions which were added at approximately 5-minute intervals. The solution was then matured by stirring the solution for 1 hour while maintaining a temperature of 20±2° C. A resultant solution was filtered through a 1500-mesh stainless steel gauze. After filtration, the solution had a PPTA concentration of 6 weight %.

Then, 100 g of the PPTA solution obtained as above was weighed out into a flask. Further, 300 g of NMP was added to the flask so as to obtain a solution whose PPTA concentration was 1.5 weight %. This solution was stirred for 60 minutes. Next, 6 g of Alumina C (manufactured by Nippon Aerosil Co., Ltd.) and 6 g of Advanced Alumina AA-03 (manufactured by Sumitomo Chemical Co., Ltd.) were added to the solution whose PPTA concentration was 1.5 weight %, and stirring was carried out for 240 minutes. A resultant solution was filtered through a 1000-mesh metal gauze. Thereafter, 0.73 g of calcium oxide was added, followed by 240 minutes of stirring to achieve neutralization. A resultant solution was then defoamed under reduced pressure, so that a coating solution slurry was obtained.

<Preparation of Separator>

The coating solution slurry was continuously coated onto a polyethylene porous film measuring 9.5 μm in thickness. A coating film thus formed was then brought into an atmosphere having a temperature 50° C. and a relative humidity of 70%, so that the PPTA was deposited. Next, the coating film from which the PPTA was deposited was rinsed with water so as to remove the calcium chloride and the solvent. Thereafter, the coating film was continuously dried with use of a heating roller group 1 at a temperature of 88° C., and a heating roller group 2. In this way, a laminated separator roll was produced. Note here that, for convenience, an earlier stage roller group is referred to as "heating roller group 1", and a later stage roller group is referred to as "heating roller group 2". An earlier stage half of rollers in the heating roller group 2 had a temperature which differed from a later stage half of rollers in the heating roller group 2. Note that the "earlier stage half of rollers" refers to an upstream half of the heating roller group 2, and the "later stage half of rollers" refers to a downstream half of the heating roller group 2. The earlier stage half of rollers of the heating roller group 2 had a temperature of 108° C., and the later stage half of rollers of the heating roller group 2 had a temperature of 127° C. The laminated separator of the laminated separator roll thus obtained had a thickness of 14.5 μm and an air permeability of 364.1 sec/100 mL. An amount of filler in the porous layer was 66 weight %.

Example 2

A laminated separator roll was produced in a manner similar to Example 1, except that (i) a polyethylene porous film having a thickness of 12.3 μm was used as the base material, and (ii) the later stage half of rollers of the heating roller group 2 had a temperature of 126° C. The laminated separator of the laminated separator roll thus produced had a thickness of 14.8 μm and an air permeability of 288.5 sec/100 mL.

Example 3

A laminated separator roll was produced in a manner similar to Example 1, except that (i) a polyethylene porous film having a thickness of 10.1 μm was used as the base material, and (ii) the later stage half of rollers of the heating roller group 2 had a temperature of 125° C. The laminated separator of the laminated separator roll thus produced had a thickness of 15.9 μm and an air permeability of 301.1 sec/100 mL.

Comparative Example 1

A laminated separator roll was produced in a manner similar to Example 1, except that the later stage half of rollers of the heating roller group 2 had a temperature of 113° C. The laminated separator of the laminated separator roll thus produced had a thickness of 15.1 μm and an air permeability of 357.1 sec/100 mL.

Comparative Example 2

A laminated separator roll was produced in a manner similar to Example 2, except that the later stage half of rollers of the heating roller group 2 had a temperature of 110° C. The laminated separator of the laminated separator roll thus produced had a thickness of 14.7 μm and an air permeability of 264.5 sec/100 mL.

Comparative Example 3

A laminated separator roll was produced in a manner similar to Example 3, except that the later stage half of rollers of the heating roller group 2 had a temperature of 114° C. The laminated separator of the laminated separator roll thus produced had a thickness of 15.4 μm and an air permeability of 301.5 sec/100 mL.

Comparative Example 4

A laminated separator roll was produced in a manner similar to Example 1, except that the heating roller group 1 had a temperature of 108° C. The laminated separator of the laminated separator roll thus produced had a thickness of 14.8 μm and an air permeability of 355.0 sec/100 mL.

Example 4

A test piece was prepared by cutting out a piece of the laminated separator produced in Example 2 so as to have a size of 120 mm in the transverse direction and 20 mm in the machine direction. The test piece was placed in a 500 mL plastic container having a lid, and then propylene carbonate was introduced into the plastic container. The propylene carbonate was introduced in an amount such that the test piece was completely submerged in liquid. The plastic container was then sealed and left to stand in an environment whose temperature was 23° C. After 24 hours, the test piece was removed from the plastic container and the surfaces of the test piece were wiped so as to remove excess propylene carbonate therefrom. Next, the test piece was placed in a 500 mL plastic container having a lid, and then ethanol was introduced into the plastic container. The ethanol was introduced in an amount such that the test piece was completely submerged in liquid. After 1 hour, the test piece was removed from the plastic container and further cleaned with ethanol. The test piece was then spread out onto a glass plate and dried for 48 hours in an atmosphere having a temperature of 23° C. After drying, the test piece was cut to a size of 100 mm in the transverse direction and 8 mm in the machine direction, and then once again immersed in propylene carbonate in the same manner as above. Then, 30-minute elongation percentage and 24-hour elongation percentage were measured via the method described above in the section titled "Elongation percentage evaluation".

[Results]

Table 1 below shows the results of evaluations of the Examples and Comparative Examples.

TABLE 1

| | Elongation percentage (%) | | Elongation percentage difference | After 0.5 h Wrinkle evaluation | After 24 h | | |
|---|---|---|---|---|---|---|---|
| | | | | | Thickness (μm) | Thickness of wrinkled portion (μm) | Wrinkle evaluation |
| | 0.5 h | 24 h | (%) | | | | |
| Ex. 1 | 0.24% | 0.36% | 0.12% | VG | 14.5 | — | VG |
| Ex. 2 | 0.16% | 0.21% | 0.05% | VG | 14.8 | — | VG |
| Ex. 3 | 0.36% | 0.52% | 0.16% | VG | 15.9 | 16.1 | G |
| Com. Ex. 1 | 0.39% | 0.61% | 0.22% | VG | 15.1 | 16.9 | P |
| Com. Ex. 2 | 0.25% | 0.48% | 0.23% | VG | 14.7 | 16.4 | P |
| Com. Ex. 3 | 0.20% | 0.60% | 0.40% | VG | 15.4 | 18.6 | P |
| Com. Ex. 4 | 0.38% | 0.64% | 0.26% | VG | 14.8 | 16.6 | P |

Note:
In the above table, "Ex." stands for "Example," "Com. Ex." stands for "Comparative Example," "VG" stands for "very good," "G" stands for "good," and "P" stands for "poor."

Examples 1 to 3 each had an elongation percentage difference of not more than 0.20%, whereas Comparative Examples 1 to 4 each had an elongation percentage difference exceeding 0.20%. Each of Examples 1 to 3 either had no wrinkles or had wrinkles which were smaller than those of Comparative Examples 1 to 4. Note that each of Comparative Examples 1 to 4 (having an elongation percentage difference exceeding 0.20%) had no wrinkles at the time of wrinkle evaluation after 30 minutes, but had large wrinkles after 24 hours.

Table 2 shows a comparison between Example 2 and Example 4.

TABLE 2

| | Elongation percentage (%) | | Elongation percentage difference (%) |
|---|---|---|---|
| | 0.5 h | 24 h | |
| Example 2 | 0.16% | 0.21% | 0.05% |
| Example 4 | 0.15% | 0.19% | 0.04% |

Example 4 assumes the case of a separator which has been removed from a nonaqueous electrolyte secondary battery that has been produced. In Example 2, measurement of elongation percentage was carried out soon after separator production, but in Example 4, measurement of elongation percentage was carried out after first immersing the separator in electrolyte and then drying the separator. However, elongation percentage difference was nearly the same in Example 2 and Example 4. Thus, the above-described method of measurement makes it possible to determine the elongation percentage difference even for a separator which has been removed from a nonaqueous electrolyte secondary battery that has been produced.

INDUSTRIAL APPLICABILITY

An aspect of the present invention can be used in producing a nonaqueous electrolyte secondary battery separator in which thickness unevenness caused by wrinkles is reduced.

REFERENCE SIGNS LIST

10 Porous film
20 Porous layer

The invention claimed is:

1. A method of producing a nonaqueous electrolyte secondary battery laminated separator including a polyolefin porous film, the method comprising:
   a step of applying a coating solution including a resin to a separator original sheet including the polyolefin porous film,
   a drying step in which the separator original sheet to which the coating solution has been applied is dried in at least two stages each having a respective temperature which is set such that at least two differing temperatures are utilized in the drying step,
   the at least two stages of the drying step including a stage in which the separator original sheet to which the coating solution has been applied is heated at a temperature which is not less than 100° C. and not more than 115° C. and a stage in which the separator original sheet to which the coating solution has been applied is heated at a temperature which is not less than 116° C. and not more than 130° C.

2. A nonaqueous electrolyte secondary battery laminated separator comprising:
   a nonaqueous electrolyte secondary battery separator including a polyolefin porous film; and
   a porous layer,
   wherein when a test piece cut out from the nonaqueous electrolyte secondary battery separator having a size of 100 mm by 8 mm is immersed in propylene carbonate, the test piece exhibits an elongation percentage difference of not more than 0.20%, the elongation percentage difference being a difference between (i) an elongation percentage in a longitudinal direction of the test piece as observed after 30 minutes of immersion in propylene carbonate and (ii) an elongation percentage in the longitudinal direction of the test piece as observed after 24 hours of immersion in propylene carbonate, the longitudinal direction of the test piece being a direction in which an elongation percentage of the nonaqueous electrolyte secondary battery separator is greatest.

3. The nonaqueous electrolyte secondary battery laminated separator according to claim 2, wherein the porous layer contains at least one resin selected from the group consisting of a (meth)acrylate-based resin, a fluorine-containing resin, a polyamide-based resin, a polyimide-based resin, a polyester-based resin, and a water-soluble polymer.

4. The nonaqueous electrolyte secondary battery laminated separator according to claim 3, wherein the polyamide-based resin is an aramid resin.

5. A nonaqueous electrolyte secondary battery comprising:
   the nonaqueous electrolyte secondary battery laminated separator recited in claim 2.

6. A nonaqueous electrolyte secondary battery member comprising:
   a positive electrode;
   the nonaqueous electrolyte secondary battery laminated separator recited in claim 2; and
   a negative electrode,
   the positive electrode, the nonaqueous electrolyte secondary battery laminated separator, and the negative electrode being arranged in this order.

* * * * *